United States Patent [19]

Ohno et al.

[11] Patent Number: 4,469,619
[45] Date of Patent: Sep. 4, 1984

[54] METHOD OF MANUFACTURING A GREEN PHOSPHOR

[75] Inventors: Katsutoshi Ohno, Tokyo; Tomohiko Abe, Yokohama, both of Japan; Teruhiko Hoshina, deceased, late of Kanagawa, Japan; by Ikuko Hoshina, heir, Yokohama, Japan; by Aya Hoshina, heir, Yokohama, Japan; by Ken-Nosuke Hoshina, heir, Yokohama, Japan

[73] Assignee: Sony Corporation, Tokyo, Japan

[21] Appl. No.: 430,952

[22] Filed: Sep. 30, 1982

[30] Foreign Application Priority Data

Sep. 30, 1981 [JP] Japan ............................ 56-155084

[51] Int. Cl.³ ........................................... C09K 11/475
[52] U.S. Cl. ............................................. 252/301.4 R
[58] Field of Search ................................. 252/301.4 R

[56] References Cited

U.S. PATENT DOCUMENTS 3,368,980  2/1968  Avella et al. ................. 252/301.4 R
3,485,768 12/1969  Ropp ............................ 252/301.4 R
4,070,301  1/1978  Tomiki et al. ................ 252/301.4 R
4,208,611  6/1980  Watanabe et al. ......... 252/301.4 R X

OTHER PUBLICATIONS

Holloway et al., "Chem. Abstracts", vol. 65, 1966.

*Primary Examiner*—Jack Cooper
*Attorney, Agent, or Firm*—Hill, Van Santen, Steadman & Simpson

[57] ABSTRACT

A method for manufacturing a luminescent material having the formula:

$Y_3Al_5O_{12}:Tb$

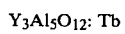

in which the raw materials for the synthesis are combined in appropriate amounts together with a flux consisting of barium fluoride, barium chloride, or mixtures of the two and then heated in a sealed state to a temperature between about 1300° C. and 1600° C. The resultant product is then leached with an alkaline or acid solution to remove the residual flux from the product.

6 Claims, 6 Drawing Figures

FIG. I
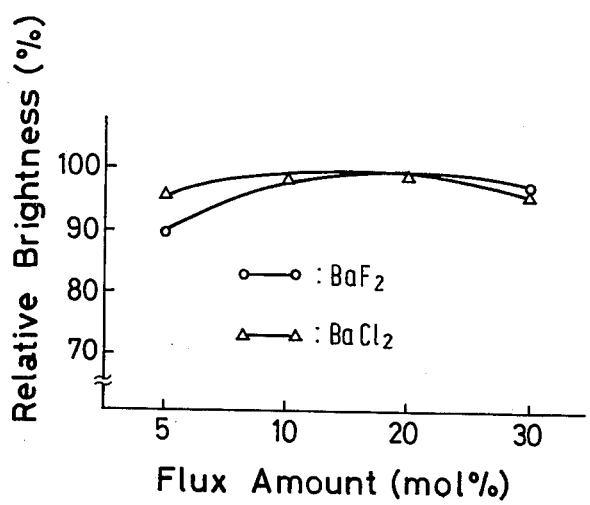
FIG. 2
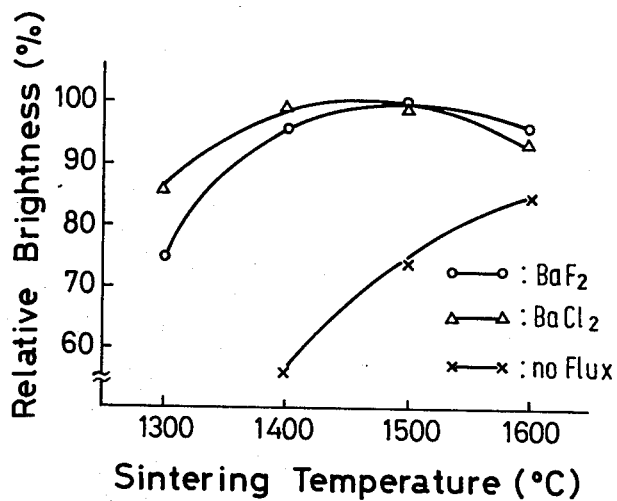

METHOD OF MANUFACTURING A GREEN PHOSPHOR

BACKGROUND OF THE INVENTION

1. Field of the Invention

The present invention is in the field of manufacturing luminescent phosphors for cathode ray tubes wherein the raw materials are combined and sintered in combination with a flux containing barium fluoride, barium chloride, or both. The sintering is conducted under sealed conditions, and residual flux is then removed by leaching.

2. Description of the Prior Art

A projection cathode ray tube is excited at a higher level than a conventional cathode ray tube, so that the temperature of the screen is accordingly higher. As a result, the phosphor may become dark, causing temperature quenching and current brightness saturation. In order to prevent this, it has been proposed to eliminate the temperature rise of the phosphor on a projection cathode ray tube by cooling with air by means of a fan or by means of liquid cooling, or to use a phosphor which has excellent current brightness saturation characteristics. However, the results obtained by these measures are not completely satisfactory. Thermal quenching of green is very pronounced, and the white balance is thereby disturbed. When liquid cooling is used, the temperature of the screen of the projection cathode ray tube is raised to as high as 80° C. which results in a reduction of about ¼ in the initial brightness of the currently used green phosphor ($Gd_2O_2S$:Tb). Even if an attempt is made to excite the phosphor by an increased current density, the currently used phosphor does not have satisfactory current brightness saturation characteristics.

The phosphor composition $Y_3Al_5O_{12}$:Tb is produced by the substitution of Tb for Y in a single phase system of $Y_3Al_5O_{12}$. In the preparation of $Y_3Al_5O_{12}$, the compounds $YAlO_3$ and $Y_4Al_2O_9$ tend to be produced simultaneously, and the preparation of a single phase of $Y_3Al_5O_{12}$ is difficult even if the elements are mixed in stoichiometric amounts.

A report by Naka, Takenaka et al, in Kogyokagaku, Vol. 69, No. 6 (1966) states that the single phase of $Y_3Al_5O_{12}$ can be prepared by sintering the raw materials at 1490° C. for five hours, pulverizing, mixing, and forming the mixture and then sintering the mixture again at 1490° C. for 24 hours. J. S. Abell et el, reported in J. Mater. Sci., Vol. 9 (1974) that a single phase of $Y_3Al_5O_{12}$ can be prepared by sintering the raw materials at 1500° C., pulverizing and mixing them, and then sintering the resulting mixture at 1600° C. for two hours. The Tb for substituting a portion of the Y of the single phase is commercially available in the form of $Tb_4O_7$, and is not stable in the form of $Tb^{3+}$. Therefore, $Tb^{4+}$ must be reduced in making the substitution, which further complicates the preparation of the single phase material $Y_3Al_5O_{12}$:Tb.

SUMMARY OF THE INVENTION

The present invention provides a method for manufacturing a green phosphor having excellent thermal properties and current brightness saturation characteristics. The method of the present invention involves manufacturing a green phosphor comprising the steps of sintering raw materials for the synthesis of $Y_3Al_5O_{12}$:Tb in a sealed atmosphere using a flux of barium fluoride ($BaF_2$), barium chloride ($BaCl_2$) or mixtures thereof so as to prevent evaporation of the flux, and finally removing the residual flux as by leaching.

In order to synthesize $Y_3Al_5O_{12}$:Tb, the compounds $Y_2O_3$, $Al_2O_3$, and $Tb_4O_7$ are mixed together in suitable proportions, and the resultant mixture is sintered at a suitable temperature whereupon suitable post treatments are performed. In accordance with the present invention, during the synthesis $BaF_2$, $BaCl_2$, or a mixture of these fluxes is added in an amount of up to about 30 mol%, and preferably about 10 to 20 mol% of the amount of phosphor. The sintering temperature is preferably controlled such that the maximum temperature is within the range of about 1300° to 1600° C. The sintering time is preferably within a range of about 1 to 8 hours. The apparatus for sintering the raw materials may be any of a wide variety, as long as it is capable of preventing weight reduction due to evaporation of the flux from the device. An example of a suitable device is an alumina crucible having a lid which may be sealed with an adhesive capable of withstanding high temperatures.

The phosphor produced in the manner described, without further treatment can be used in a projection type cathode ray tube, and the brightness in the initial period of its excitation is equivalent to that of a projection cathode ray tube which uses the conventional phosphor $Gd_2O_2S$:Tb. However, as time elapses, the brightness decreases and the screen turns a brownish color. This is caused by a so-called "burning" of the phosphor. X-ray diffraction of the particle surface of the phosphor reveals attachment of residual flux to the particle surfaces. If the phosphor is annealed at temperatures above the evaporation temperature of the flux, in various gases such as air, nitrogen, hydrogen, or a mixture of nitrogen and hydrogen, satisfactory results are not obtained. However, when the phosphor was rinsed with an aqueous solution of suitable concentration of an acid such as nitric acid or hydrochloric acid, or an aqueous solution of an alkali such as sodium hydroxide, improved results were obtained. X-ray diffraction of the phosphor after such leaching showed no peaks due to the residual flux.

The green phosphor obtained in this manner had an improved relative brightness and was resistant to "burning". The method of the present invention thus allows a simplified manufacture of a green phosphor having the formula $Y_3Al_5O_{12}$:Tb having improved performance characteristics.

BRIEF DESCRIPTION OF THE DRAWINGS

A further description of the present invention will be made in conjunction with the attached sheets of drawings in which:

FIG. 1 is a graph plotting relative brightness as a function of the amount of flux present;

FIG. 2 is a graph plotting relative brightness as a function of sintering temperature;

DESCRIPTION OF THE PREFERRED EMBODIMENTS

Figure 3:
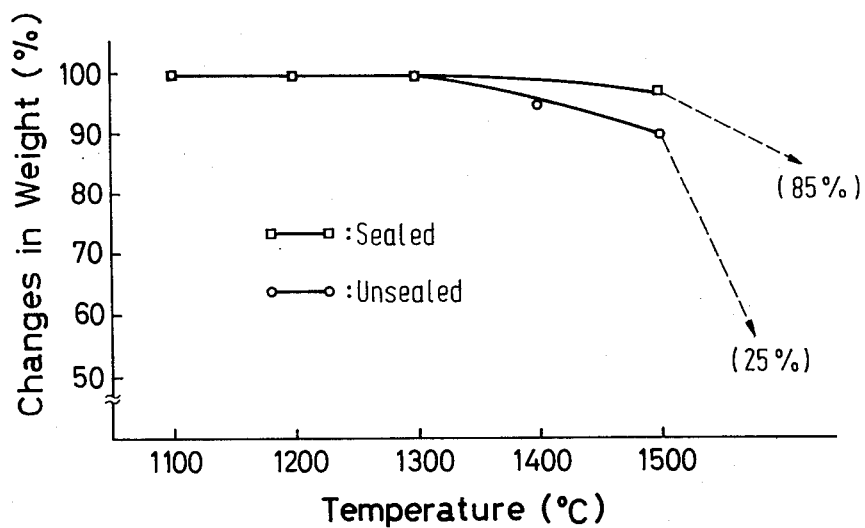
FIG. 3 is a graph illustrating the changes in weight of flux at various temperatures when the treating vessel was sealed and unsealed.

The present invention will now be described by way of specific examples.

EXAMPLE 1

The raw materials for sintering 1 mol of $Y_3Al_5O_{12}$:Tb in which the ratio of Tb to the sum of Y+Tb was 5 mol% were combined as follows: 321.78 g of $Y_2O_3$, 254.9 g of $Al_2O_3$ and 28.04 g of $Tb_4O_7$ were mixed together in powdery form. A flux of $BaF_2$ was added to the resultant mixture in various amounts. The mixtures were heated at a rate of 200° C. per hour to 1500° C. and were sintered at this temperature for 2 hours. An alumina crucible with a lid was used. An adhesive known as "Aronceramic D" available from the Toagosei Chemical Industry Co., Ltd. was used to seal together the lid and the crucible body.

FIG. 1 illustrates the relative brightness as a function of the amount of flux, utilizing the brightness of a phosphor obtained by sintering the raw materials at 1500° C. for 2 hours with 20 mol% of $BaF_2$ is taken as 100%. From the graph shown in FIG. 1, it will be seen that the addition of $BaF_2$ or $BaCl_2$ in even small amounts serve to maintain a relatively uniform relative brightness.

EXAMPLE 2

The procedure of Example 1 was followed except that the amount of flux was 20 mol% and the sintering time was 2 hours, the sintering temperature being varied. FIG. 2 shows a relative brightness as a function of the sintering temperature, using the brightness of the phosphor obtained by sintering the raw materials at 1500° C. for 2 hours using 20 mol% of $BaF_2$ as a value of 100%.

COMPARATIVE EXAMPLE

A phosphor was prepared in the same manner as in Example 2 except that no flux was used. FIG. 2 shows the relative brightness obtained with this phosphor. As may be seen from this Figure, when no flux was used the relative brightness was low. Even with sintering at 1600° C., the relative brightness was about 85% and the brightness did not improve even if sintering at 1600° C. was repeated thereafter. In contrast, with a phosphor produced according to the present invention, the relative brightness was 80% or higher at a sintering temperature of 1300° C. and exhibited satisfactory results. Observation by means of an electron microscope of the phosphor produced without flux revealed poor crystal growth, while an examination of the material produced with the flux revealed excellent crystal growth.

A phosphor was also prepared in the same manner as in Example 1 except that the crucible was only covered with the lid and not sealed by means of the adhesive. The relative brightness of this phosphor was 60% of that of the phosphor of Example 1. FIG. 3 shows the results of thermogravimetric analysis of $BaF_2$ when a crucible with a sealed lid was used and when a crucible with an unsealed lid was used. It will be seen from this graph that in the case of the unsealed crucible, a weight reduction in $BaF_2$ of about 5% was observed at a sintering temperature of 1400° C. and about 10% at a sintering temperature of 1500° C. When the $BaF_2$ was held at 1500° C. for one hour, it was reduced in weight to about 25%. On the other hand, when the crucible is sealed, a weight reduction of only about 3% was obtained at 1500° C. and only about 15% after a holding at 1500° C. for one hour. It will be seen from these results that improved results are obtained if the crucible is sealed with an adhesive capable of withstanding high temperatures. The "sealed" state referred to herein means a state wherein the evaporation of the flux is suppressed to a degree which does not substantially degrade the characteristics of the green phosphor.

In accordance with the method of the present invention the phosphor obtained by sintering the raw materials together with the flux at predetermined temperatures for predetermined periods of time is then leached with an acid or alkali in order to remove the residual flux. The leaching conditions are shown in the following table. In the leaching step, 10 cc of a solution of a desired concentration were used for 1 g of the phosphor. The solution was agitated for 30 to 60 minutes by means of an agitator or the like to remove the residual flux from the phosphor. The table shows the degree of "burning" of the sample after leaching, and the amount of $Ba^{++}$ precipitated into the leaching solution. The leaching conditions were such that 757 μg/ml of $Ba^{++}$ was obtained if all of the $BaF_2$ was precipitated and no portion thereof was evaporated.

From these results it was determined that the preferred leaching solution was a solution of from 0.2N to 5.0N $HNO_3$.

TABLE

| Concentration and Type of Rinsing Solution | | Amount of Precipitated $Ba^{++}$ (μg/ml) | Degree of "burning" |
|---|---|---|---|
| | $H_2O$ | 26 | x |
| 0.26N | $HNO_3$ | 285 | xx |
| 0.5N | $HNO_3$ | 473 | xx |
| 1.0N | $HNO_3$ | 638 | xxx |
| 2.1N | $HNO_3$ | 650 | xxxx |
| 4.2N | $HNO_3$ | 650 | xxxx |
| 0.3N | HCl | 385 | xx |
| 0.65N | HCl | 580 | xxx |
| 1.3N | HCl | 618 | xxxx |
| 2.6N | HCl | 625 | xxxx |
| 3 wt % | NaOH | 300 | xx |
| 5 wt % | NaOH | 400 | xx |
| 10 wt % | NaOH | 510 | xxx |
| 20 wt % | NaOH | 650 | xxxx |

Figure 4:
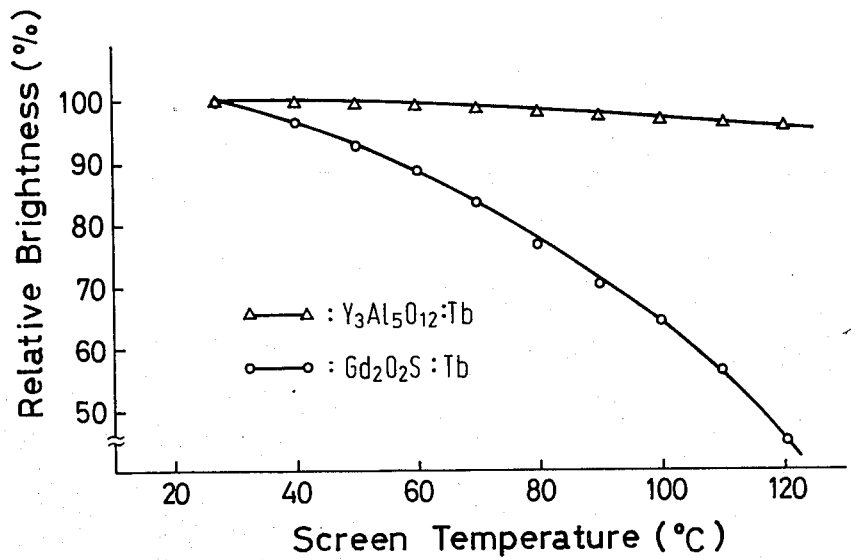
FIGS. 4 and 5 are graphs plotting relative brightness as a function of screen temperature.

Degree of "burning" was evaluated by visual observation with reference to the currently used $Gd_2O_2S$:Tb
x: Degree of "burning" is greater than that of $Gd_2O_2S$:Tb
xx: Degree of "burning" is substantially equivalent to that of $Gd_2O_2S$:Tb
xxx: Degree of "burning" is slightly weaker than that of $Gd_2O_2S$:Tb
xxxx: Degree of "burning" is smaller than that of $Gd_2O_2S$:Tb A projection cathode ray tube was manufactured using the improved phosphor of the present invention and a comparison was made between this cathode ray tube and a projection screen which used the conventional $Gd_2O_2S$:Tb phosphor. FIG. 4 shows the relative brightness as a function of the screen temperature. The brightness when the phosphor was at 25° C. was plotted as 100% brightness. With a projection cathode ray tube which uses the liquid cooling method, the screen temperature rises to as much as 80° C., and the brightness at this temperature was reduced by about 23% from the original brightness. Conversely, with the phosphor of the present invention, the initial brightness remained almost constant even at 80° C.

Figure 5:
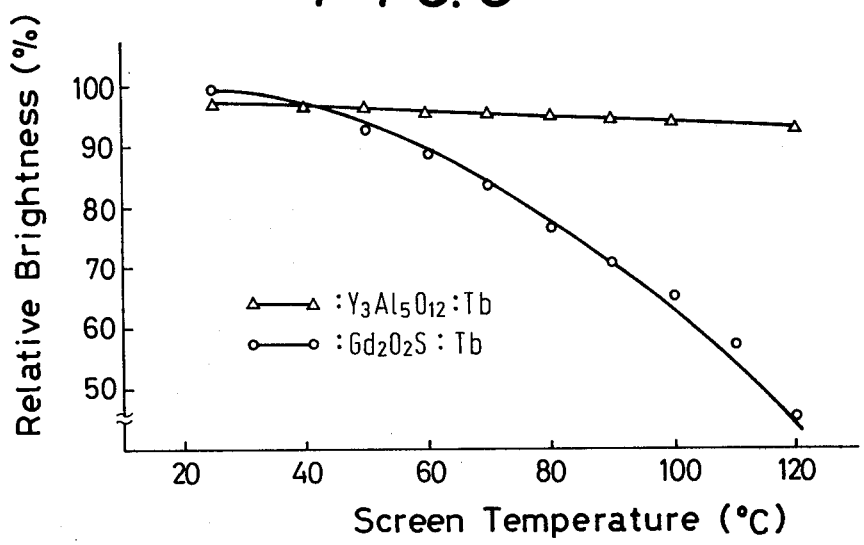

FIG. 5 shows the relative brightness when the brightness of $Gd_2O_2S$:Tb in excited condition at 25° C. at 27 KV and 8 μA/cm$^3$ was plotted as 100%. The phosphor of the present invention had a brightness of about 97% of that of the conventional phosphor even at 25° C. The brightness of the phosphor of the present invention remained the same as that shown in FIG. 4 when the screen temperature was 80° C.

Figure 6:
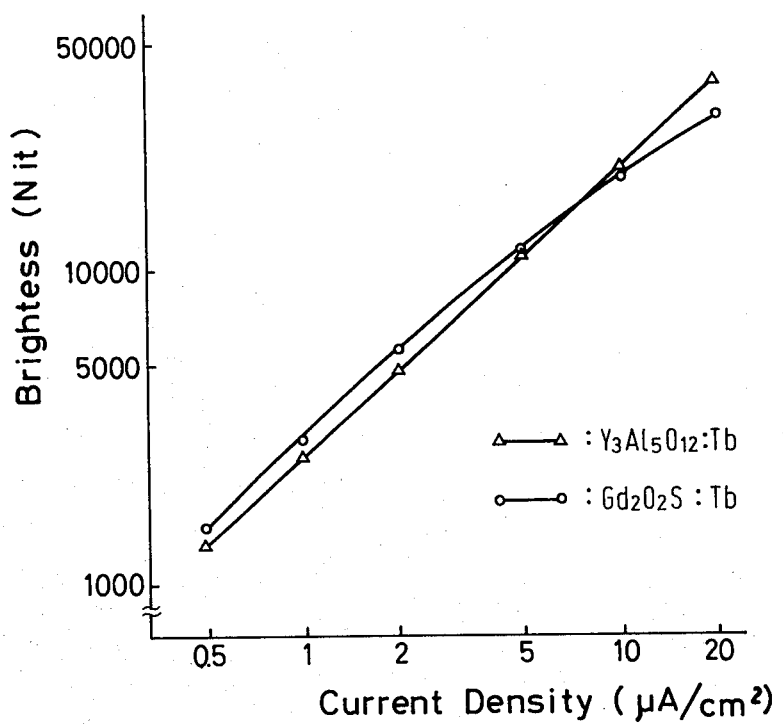
FIG. 6 is a graph plotting brightness as a function of current density.

FIG. 6 plots brightness as a function of current density in an actual projection cathode ray tube. It will be seen from this graph that both phosphors are excellent in performance characteristics.

It should be evident that various modifications can be made to the described embodiments without departing from the scope of the present invention.

We claim as our invention:

1. A method for the manufacture of a luminescent material having the formula:

$$Y_3Al_5O_{12}:Tb$$

which comprises the steps of:
preparing a mixture of $Y_2O_3$, $Al_2O_3$ and $Tb_4O_7$ in amounts suitable for synthesis of $Y_3Al_5O_{12}$:Tb together with up to 30 mol % of a flux of $BaF_2$, $BaCl_2$, or mixtures thereof,
heating the resulting mixture in a sealed vessel to a temperature between about 1300° C. and about 1600° C., to produce a product consisting predominantly of $Y_3Al_5O_{12}$:Tb, and
leaching the resulting product with a leaching solution so as to remove the residual flux from said product wherein said flux is present in an amount sufficient to effect a luminescent material exhibiting a higher brightness than the material prepared as above absent the flux, and wherein said luminescent material exhibits a higher brightness than the luminescent material prepared as above but where the heating is conducted in an unsealed covered vessel.

2. A method according to claim 1 in which said leaching solution is $HNO_3$.

3. A method according to claim 1 in which said leaching solution is HCl.

4. A method according to claim 1 in which said leaching solution is NaOH.

5. A method according to claim 1 in which said mixture is sealed in a crucible so that leakage of said flux from said crucible is substantially suppressed.

6. A method according to claim 2 in which the concentration of $HNO_3$ is in the range from 0.2N to 5.0N.

* * * * *